United States Patent
Matsuki et al.

(10) Patent No.: US 8,402,656 B2
(45) Date of Patent: Mar. 26, 2013

(54) DIAPHRAGM DAMPER AND METHOD OF PRODUCTION AND PRODUCTION APPARATUS OF SAME

(75) Inventors: Takuji Matsuki, Tokyo (JP); Masahide Shimada, Tokyo (JP)

(73) Assignee: Eagle Industry Co., Ltd., Tokyo (JP)

(*) Notice: Subject to any disclaimer, the term of this patent is extended or adjusted under 35 U.S.C. 154(b) by 392 days.

(21) Appl. No.: 12/719,447

(22) Filed: Mar. 8, 2010

(65) Prior Publication Data

US 2010/0162553 A1 Jul. 1, 2010

Related U.S. Application Data

(62) Division of application No. 10/571,312, filed as application No. PCT/JP2004/013212 on Sep. 10, 2004, now abandoned.

(30) Foreign Application Priority Data

Sep. 12, 2003 (JP) .................................. 2003-321626

(51) Int. Cl.
*B21K 1/20* (2006.01)
*B23K 26/00* (2006.01)
*F04B 11/00* (2006.01)

(52) U.S. Cl. .................. 29/890.125; 29/463; 29/890.12; 29/890.131; 123/510; 219/121.64; 417/540

(58) Field of Classification Search ............... 29/463, 29/890.12, 890.125, 890.131; 123/510; 219/121.64; 219/121.82; 417/540
See application file for complete search history.

(56) References Cited

U.S. PATENT DOCUMENTS

| 6,537,268 B1* | 3/2003 | Gibson et al. .............. 604/891.1 |
| 2002/0121506 A1 | 9/2002 | Menin |
| 2003/0164161 A1 | 9/2003 | Usui et al. |
| 2006/0272144 A1* | 12/2006 | Matsuki et al. ................. 29/463 |
| 2010/0206856 A1* | 8/2010 | Tanaka et al. ............. 219/121.64 |

FOREIGN PATENT DOCUMENTS

| EP | 1 236 535 A2 | 9/2002 |
| EP | 1 342 911 A2 | 9/2003 |
| JP | 04-182092 | 6/1992 |
| JP | 07-045114 A | 2/1995 |
| JP | 09-216054 A | 8/1997 |
| JP | 2002-307185 A | 10/2002 |
| JP | 2003-001490 A | 1/2003 |
| JP | 2003-254191 A | 9/2003 |

\* cited by examiner

*Primary Examiner* — Alexander P Taousakis
(74) *Attorney, Agent, or Firm* — Arent Fox LLP

(57) ABSTRACT

A method of producing a diaphragm damper 1 having a high pressure chamber 3 comprised of two diaphragms 2 with flanges 6 welded together and charged inside with a high pressure gas. The diaphragms 2 are made of magnetically attractable thin metal sheets. A pair of jigs 30, 40 provided to face each other inside the pressure vessel 20 hold the diaphragms 2 by magnetic force. The pressure vessel 20 is sealed and evacuated, then the pressure vessel 20 is charged and pressurized by a mixed gas including helium. After this, the pair of jigs 30, 40 are made to approach each other to make the flanges 6 of the pair of diaphragms 2 come into close contact. Inside the pressure vessel 20, the jigs 30, 40 are simultaneously rotated to rotate the pair of diaphragms 2 and a laser beam is fired at the flanges 6 of the diaphragms 2 to weld the flanges 6 over their entire circumferences.

6 Claims, 4 Drawing Sheets

DIAPHRAGM DAMPER AND METHOD OF PRODUCTION AND PRODUCTION APPARATUS OF SAME

CROSS-REFERENCE TO RELATED APPLICATION

This application is a Divisional Application of U.S. patent application Ser. No. 10/571,312, filed Mar. 9, 2006, now abandoned, which in turn is a National Stage entry of International Application Number PCT/JP2004/013212, filed Sep. 10, 2004, claiming the benefit of priority of Japanese Patent Application No. 2003-321626 filed Sep. 12, 2003. The disclosures of the prior applications are hereby incorporated by reference herein in their entirety.

TECHNICAL FIELD

The present invention relates to a diaphragm damper for absorbing pulsation used in for example a high pressure fuel pump or other location where pulsation occurs and to a method of production and production apparatus for the same.

BACKGROUND ART

As a conventional device for absorbing pulsation of this type, the device shown in for example Japanese Patent Publication (A) No. 11-280904 is known. In the device shown in this publication, a fuel pump is equipped with a high pressure accumulator. This high pressure accumulator absorbs part of the pulsation of the pressure of the fuel discharged from the fuel pump to reduce the pulsation width of the fuel pressure and thereby stabilize the amount of injection of fuel.

The high pressure accumulator shown in this publication is provided with a thick disk shaped high pressure vessel constituting a case, a thin metal disk shaped diaphragm sealed and supported by the case at its peripheral edges and working with it to form a high pressure chamber, and a disk shaped plate for determining a limit of deformation of the diaphragm. The diaphragm is shaped as a flat sheet shape. Only one is used.

To assemble this high pressure accumulator, the case is welded with the outer edge of the diaphragm to seal them, then the plate is welded. After this assembly, a high pressure gas is charged inside from a gas charging inlet provided at the case. The gas charging inlet, for example, is structured for a double seal by a steel ball press-fit in the gas charging inlet and a stopper member welded to the low pressure side of the steel ball for sealing.

However, the high pressure accumulator described in this publication has a large number of parts and is complicated in structure as well. In production, the step of assembling and welding together the case, plate, and diaphragm and the step of charging the high pressure gas are different, so the number of steps and the number of welded parts are large and the production efficiency is poor.

On the other hand, Japanese Patent Publication (B) No. 7-45114 describes a method of sealing a sealed relay in which pressurized nitrogen gas is charged. The sealing system of this sealed relay is provided with a chamber for housing a workpiece, a workpiece support member for supporting the workpiece arranged in the chamber, and a laser emission unit arranged outside of the chamber and firing a laser beam to the workpiece in the chamber. The workpiece support member has a recess for holding a metal case of the workpiece, places a metal base on a flange provided at the opening of the metal case held in the recess, fills the chamber with pressurized sealing gas, then turns the workpiece support member so that the laser beam of the laser emission unit is fired against and welds the contacting parts of the flange and metal base over their entire circumference. By using such a laser welding method, it is possible to simultaneously charge a high pressure gas and perform welding. There is also no need for a hole for charging the gas.

However, in the method of sealing a sealed relay shown in this publication, since the metal base is placed on the flange of the metal case, the contact parts of the flange and metal base to be sealed are liable to deviate in position. If deviation occurs, the weld zone will become uneven in the circumferential direction. In some cases, the welding will be insufficient and will cause a poor seal. In particular, since the laser emission unit is positioned lower than the flange of the metal case forming the seal location and the laser beam is fired at an angle from below to the flange, at parts where the metal case sticks out from the metal base, the laser beam will not sufficiently reach the metal base resulting in easy occurrence of insufficient welding. As a result, there are the problems of easy leakage of the gas charged inside etc.

DISCLOSURE OF THE INVENTION

Problems to be Solved by the Invention

The present invention was made in view of this situation and has as its first object the provision of a method of production and production apparatus of a diaphragm damper enabling a simultaneous welding and gas charging step and further enabling even welding of the seal location.

Further, a second object of the present invention is to provide a diaphragm damper facilitating inspection for leakage of gas charged inside, resistant to leakage of the charged gas over a long period, and superior in reliability.

Means for Solving the Problems

To achieve the above object, the method of production of a diaphragm damper according to the present invention is a method of production of a diaphragm damper having a high pressure chamber comprised of two diaphragms welded together at their flanges and charged inside with a high pressure gas, comprising the steps of:
    forming said diaphragms by magnetically attractable thin metal sheets and using a pair of jigs provided so as to face each other in a pressure vessel so as to hold the diaphragms by magnetic force,
    sealing and evacuating said pressure vessel, then charging and pressurizing a mixed gas including helium in said pressure vessel, then bringing the pair of jigs close to each other to bring the flanges of the pair of diaphragms into close contact, and
    simultaneously rotating said jigs in said pressure vessel to make the pair of diaphragms rotate and firing a laser beam at the outer peripheral edges of the flanges of said diaphragm from a direction substantially perpendicular to the shafts of said diaphragms so as to weld said flanges across their entire circumferences.

In the method of production according to the present invention, since the diaphragms are rotated and welded inside the pressure vessel in an atmosphere of the gas to be charged, a single pass of the laser beam enables assembly and sealed welding of the diaphragm damper (charging and sealing of the gas). Further, since the pair of diaphragms are held by the jigs by magnetic force and the flanges are brought into close contact before welding, it is possible to accurately position the flanges to be welded and possible to uniformly form a weld zone in the circumferential direction.

That is, in the present invention, it is possible to accurately weld without deviation the outer peripheral edges of the flanges of the diaphragms, possible to simultaneously perform welding and charging of the gas, and possible to uniformly weld the seal location. As a result, it is possible to provide a diaphragm damper resistant to leakage of the charged gas over a long period and superior in reliability.

Further, in the present invention, by welding the outer peripheral edges of the flanges from the true side of the flanges of the diaphragms, it is possible to fire the laser beam against the two upper and lower flanges substantially evenly. As a result, it is possible to substantially evenly melt the outer peripheral edges of the flanges to form the weld zone and possible to use the weld zone to reliably seal the mated faces of the flanges.

Preferably, each diaphragm has
a thin disk shaped flexible part formed with repeated patterns of coaxial concentric ring-shaped recesses and ring-shaped ridges,
a positioning part formed continuing from the outer periphery of this flexible part and bent to an arc-shaped cross-section so as to form a half space for a high pressure chamber in combination with said flexible part, and
a flange formed integral with the outer periphery of this positioning part to a flat ring shape, and
the diaphragms are formed to the same shapes as each other.

In the diaphragm damper, the flexible parts can flex and deform in accordance with the fluctuation in pressure of the fluid flowing in contact against the flexible parts and thereby prevent fluctuation in pressure of the fluid. By forming positioning parts at the outer peripheries of the flexible parts, it becomes easy to position and attach the diaphragms to the jigs by magnetic force and therefore the positioning precision is improved. As a result, high precision laser welding is possible and the occurrence of defective products can be reduced. Note that the positioning parts of the diaphragms are parts bent to arc-shaped cross-sections so as to form half spaces for the high pressure chamber in combination with the flexible parts. They are simple in structure and do not complicate the process of production of the diaphragms.

Further, with this method, since diaphragms of the same shape were welded together, the structure can be remarkably streamlined compared with a conventional high pressure accumulator. Further, the sealing parts required in the past are unnecessary, the number of parts is small, and the size can be reduced.

Preferably, each jig is formed with a positioning recess for holding a diaphragm so as to be positioned by said positioning part. At the center of said positioning recess, a magnet for detachably holding the diaphragm by magnetic force is arranged. With this method, the jig is also simple in structure and further the positioning precision of the diaphragm is improved.

Preferably, said mixed gas including helium gas is a mixed gas of 15 to 25 vol % of helium gas and 75 to 85 vol % of argon gas. This mixed gas is the gas sealed inside the high pressure chamber when the flanges of the diaphragms are welded and the half spaces for the high pressure chamber of the diaphragms are assembled to form the high pressure chamber.

If the vol % of the helium gas in this mixed gas is too low, the sensitivity of detection in the gas leakage test conducted after the welding falls and the accuracy of detection of gas leakage tends to fall. Further, if the vol % of the helium gas is too high, even if the diaphragm damper passes the gas leakage test, the gas charged in the high pressure chamber will tend to leak along with, long term use and a drop in pressure will occur resulting in a drop in the function as a diaphragm damper. Therefore, by using the above ratio of mixed gas, detection of leakage of the gas charged inside becomes easy and it is possible to provide a diaphragm damper resistant leakage of the charged gas over a long period and superior in reliability.

Preferably, when welding said flanges over their entire circumference, inside said pressure vessel, the pressure of said mixed gas is, by gauge pressure, a pressure of 0.1 to 0.5 MPa. The pressure of this mixed gas becomes the initial gas pressure of the mixed gas charged in the high pressure chamber of the diaphragm damper. If this pressure is too low, the function of the diaphragm damper (for example, prevention of pulsation of the fluid) tends to fall, while if too high, gas will tend to easily leak from the diaphragm damper.

The diaphragm damper according to the present invention is produced by any of the above methods.

A production apparatus of a diaphragm damper according to the present invention is provided with:
a pressure vessel able to guide a laser beam inside it at least at part of it,
a pair of jigs provided to be able to rotate freely in said pressure vessel and to be able to move toward and away from each other along the direction of their shafts, and
a laser system disposed outside said pressure vessel and disposed to be able to fire a laser beam from a direction substantially perpendicular to the shafts of said jigs to the outer peripheral edges of flanges of diaphragms,
each jig provided with:
a recess against which a positioning part provided at an inside periphery of the flange of the diaphragm may abut for positioning and
a magnet for magnetically holding the diaphragm at said recess.

According to the production apparatus according to the present invention, it becomes easily to realize the method of production of the present invention and becomes easy to realize the actions and effects of the method of production according to the present invention.

BEST MODE FOR WORKING THE INVENTION

Figure 1A:
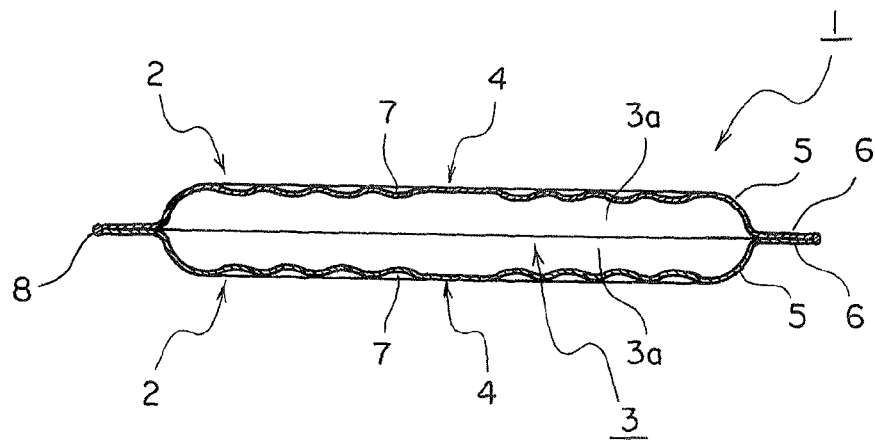
FIG. 1A is a lateral cross-sectional view of a diaphragm damper according to an embodiment of the present invention.

Below, the present invention will be explained based on an embodiment shown in the drawings.

Figure 1B:
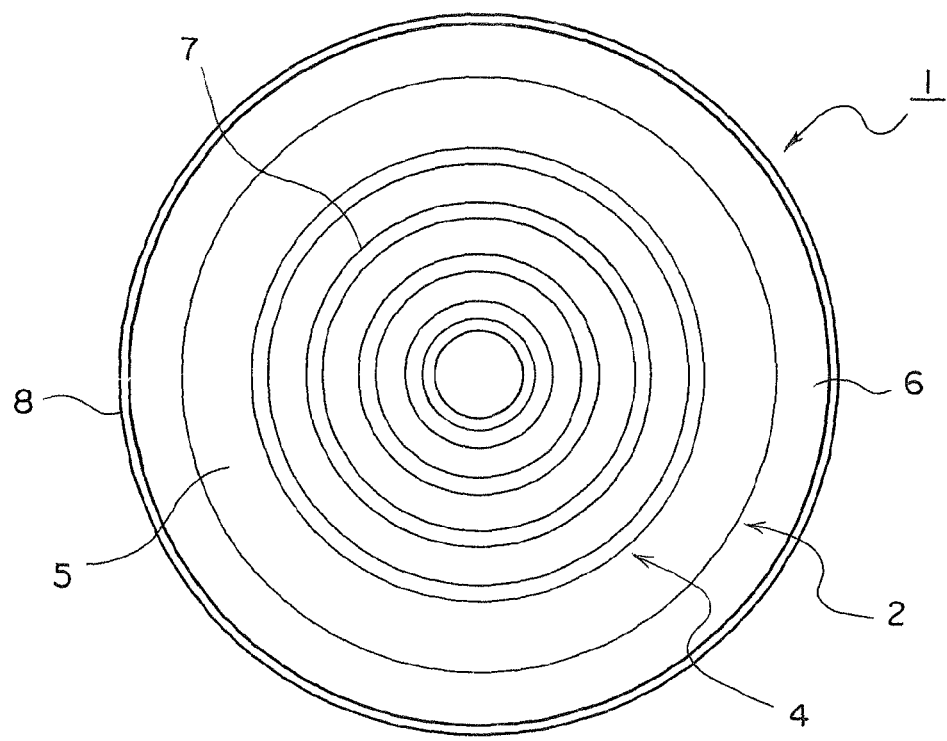
FIG. 1B is a plan view of the diaphragm damper shown in FIG. 1A.

As shown in FIG. 1A, the diaphragm damper 1 according to this embodiment has a pair of diaphragms 2, 2. These diaphragms 2 are formed into the same shapes by thin, flexible metal sheets and, as shown in FIG. 1B, when seen from a plan view, have thin disk shaped flexible parts 4 formed with repeated patterns 7 of coaxial concentric ring-shaped recesses and ring-shaped ridges.

The outer periphery of each flexible part 4, as shown in FIG. 1A, is integrally formed with a positioning part 5 bent into an arc-shaped cross-section so as to form a half space 3a of the high pressure chamber in combination with the flexible part 4. Further, the outer periphery of this positioning part 5 is integrally formed with a flat ring-shaped flange 6 so as to stick out in the radial direction.

Figure 1C:
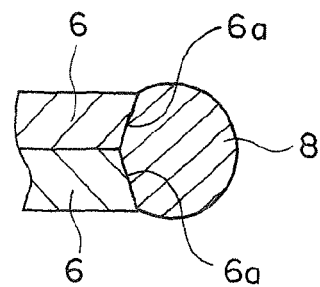
FIG. 1C is an enlarged cross-sectional view of principal parts of the diaphragm damper shown in FIG. 1A.

The flanges 6, 6 of the pair of diaphragms 2, 2 are made to abut against each other and the half spaces 3a are combined between the flexible parts 4, 4 to form the high pressure chamber 3 by, as shown in FIG. 1C, welding the outer peripheral edges 6a, 6a of the flanges 6, 6 across their entire circumferences to form a weld bead 8.

Figure 2:
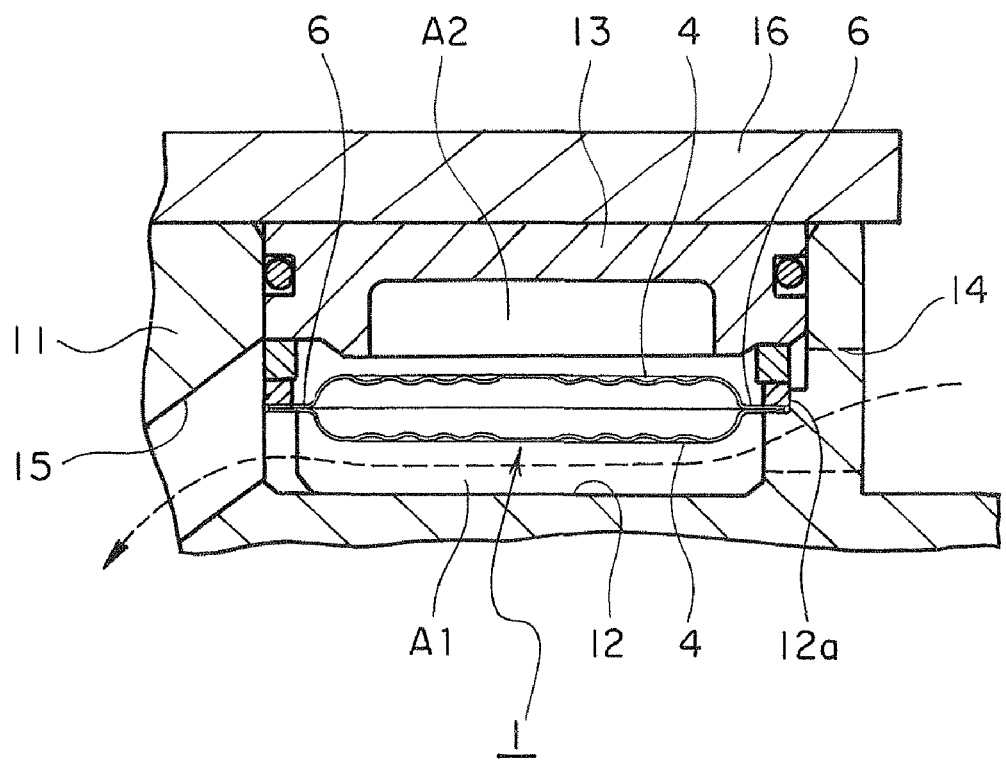
FIG. 2 is a schematic view of an example of use of the diaphragm damper shown in FIG. 1A to FIG. 10.

The diaphragm damper 1 of the present embodiment is used set for example as shown in FIG. 2. That is, a recess 12 formed in a case 11 is sealed by a lid 13 fit in the inside circumference of the opening of the recess 12. The diaphragm damper 1 is attached to this sealed space so as to divide the sealed space into a first chamber A1 and a second chamber A2.

The diaphragm damper 1 is fixed in place by its flanges 6 being sandwiched between the lid 13 and the inside peripheral walls of the recess 12. Further, the lid 13 is held down by a plate 16 fixed to the top surface of the case 11.

The case 11 is provided with an inlet passage 14 and an exit passage 15 communicating with the first chamber A1. Pulsation of the fluid flowing from the inlet passage 14 is absorbed by deformation of the flexible parts 4 of the diaphragm damper 1, then the fluid is sent to the exit passage 15. That is, the diaphragm damper 1 is disposed to absorb the pulsation of pressure of the fluid flowing from the inlet passage 14 to the exit passage 15.

For purpose, the high pressure chamber 3 of the diaphragm damper 1 according to the present embodiment is charged with a mixed gas of helium (He) gas and argon (Ar) gas at a predetermined pressure. The initial pressure P0 at the time of charging of the mixed gas into the high pressure chamber 3 is not particularly limited, but by gauge pressure is preferably 0.1 to 0.5 MPa.

Figure 4:
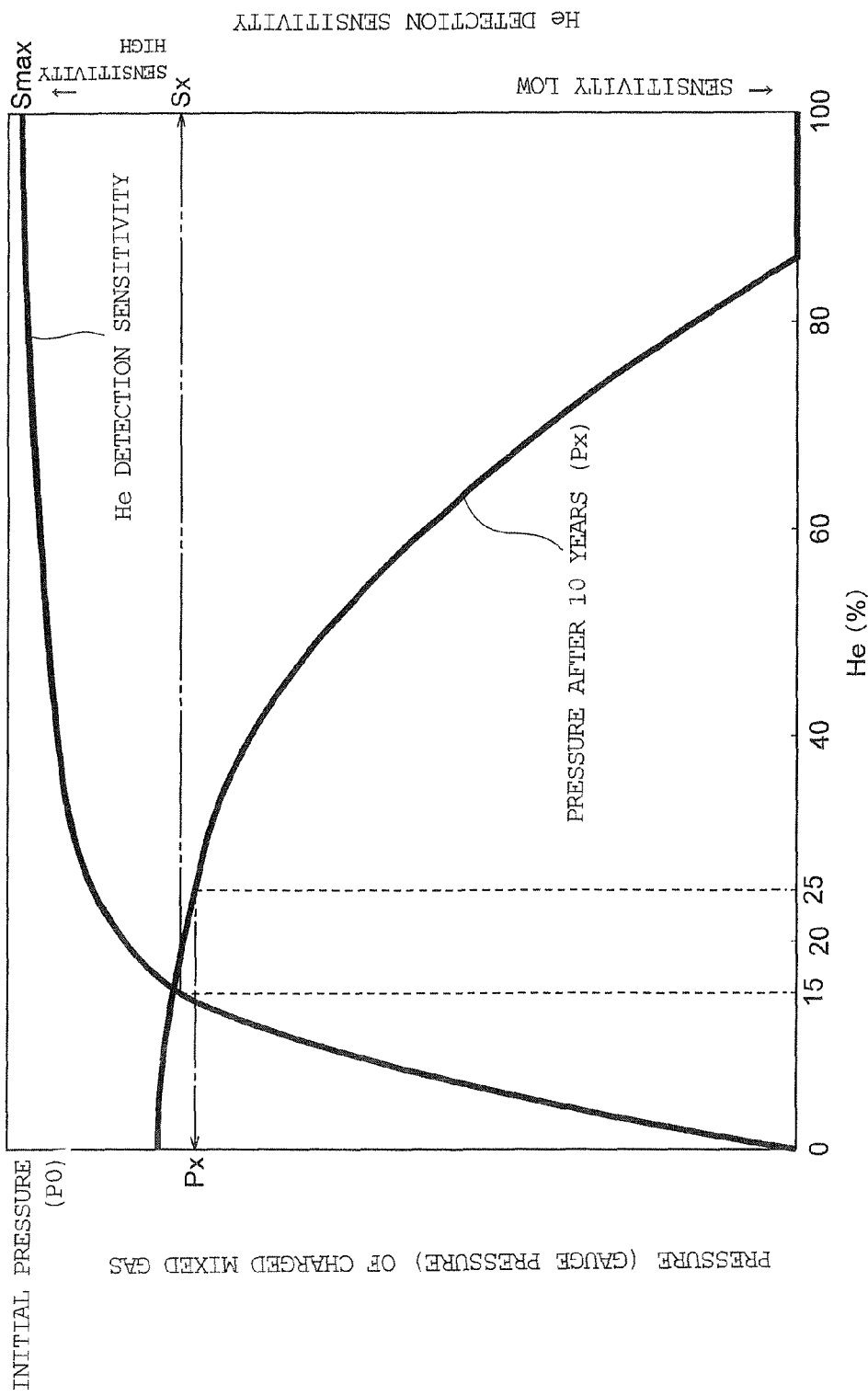
FIG. 4 is a graph of the relationship between the vol % of helium gas in the mixed gas charged in the diaphragm damper, the change in sealed pressure along with time, and the sensitivity of detection of gas leakage.

Further, at the initial charging of the high pressure chamber 3, the vol % of the helium gas in this mixed gas is 15 to 25 vol % and the vol % of the argon gas is 75 to 85 vol %. If the vol % of the helium gas in this mixed gas is, for example, lower than 15 vol %, as shown in FIG. 4, the sensitivity of detection of helium in the gas leakage test conducted after welding the weld bead shown in FIG. 1C would become lower than the reference sensitivity Sx and the accuracy of detection of gas leakage would tend to fall. The reference sensitivity Sx is a value of at least 80% of the maximum sensitivity Smax. Below this reference sensitivity Sx, the accuracy of the gas leakage test after welding falls and defective products become hard to judge.

Further, as shown in FIG. 4, if the vol % of the helium gas is higher than 25 vol %, even if a diaphragm damper passes the gas leakage test after welding, the gas charged in the high pressure chamber would tend to leak over time along with use for a long period such as 10 years and the pressure Px of the mixed gas would end up falling to below the reference pressure Px with respect to the initial pressure P0 at the time of charging. The reference pressure Px is a value of at least 75% of the initial pressure P0. Below this reference pressure Px, even if the diaphragm damper 1 is disposed for example as shown in FIG. 2, the effect of prevention of pressure pulsation would end up becoming small.

Therefore, by making the mixed gas charged in the high pressure chamber 3 a mixed gas of the above ratio, inspection of leakage of gas charged inside becomes easy and it is possible to provide a diaphragm damper resistant to leakage of the charged gas over a long period and superior in reliability.

Next, the method of production of the diaphragm damper 1 shown in FIG. 1A will be explained. First, a pair of diaphragms 2, 2 are prepared. As the metal sheet for making the diaphragms 2, metal sheet of a thickness of 0.1 to 0.4 mm is used. The material of the metal sheet is not particularly limited so long as it is a material which can be held by a magnet, but it is preferably magnetic stainless steel (precipitation hardened type stainless steel etc.) or austenitic stainless steel (after work hardening)

This metal sheet is press-formed etc. to form a flexible part 4 formed with repeated patterns 7 of coaxial concentric ring-shaped recesses and ring-shaped ridges, a positioning part 5 for forming a half space 3a, and a flange 6.

Figure 3A:
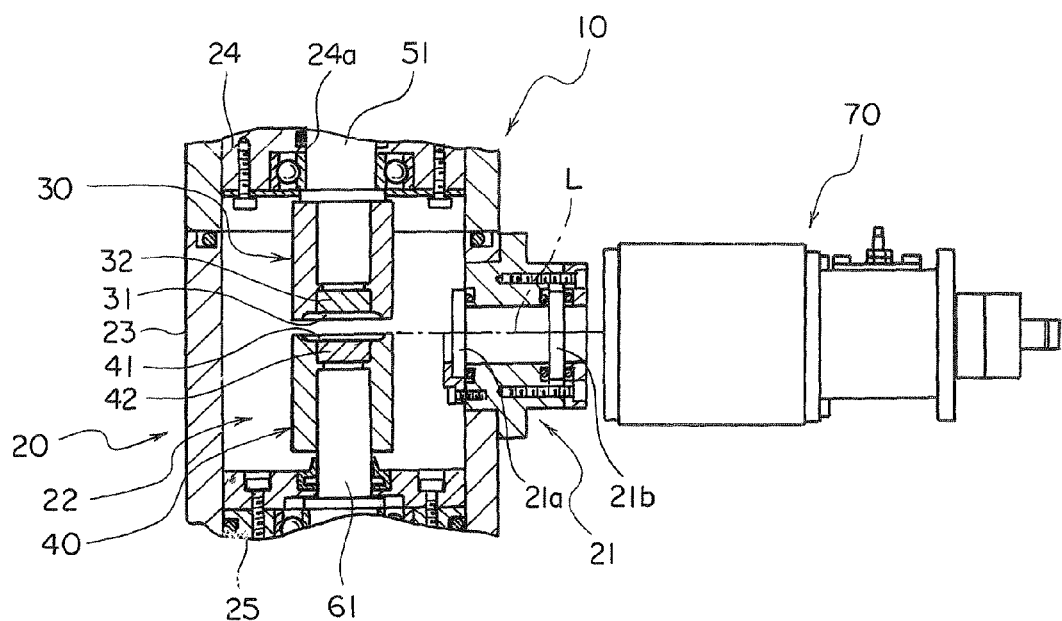
FIG. 3A is a partial cross-sectional view of a production apparatus for producing the diaphragm damper shown in FIG. 1A to FIG. 1C.

Next, the thus prepared pair of diaphragms 2 are mounted in the production apparatus 10 shown in FIG. 3A.

This production apparatus 10 has a pressure vessel 20 able to pass a laser beam and a pair of a first (upper) jig 30 and a second (lower) jig 40 provided so as to be able to freely rotate in this pressure vessel 20 and to be able to move relative to each other along the direction of their shafts. Further, outside the pressure vessel 20, a laser system 70 for firing a laser beam into the pressure vessel 20 is disposed.

The pressure vessel 20 is provided with a tubular-shaped vessel body 23 surrounding a pressure chamber 22 and a ceiling 24 and floor 25 provided at the top and bottom of the vessel body 23 and sealing the top and bottom of the pressure chamber 22. The vessel body 23 is provided with a window 21 at a single location. This window 21 is provided with an inside glass plate 21a at the inside facing the pressure chamber 22 and an outside glass plate 21b fixed as part of the vessel body 23. These outside and inside glass plates 21b, 21a are designed to pass the laser beam L. The inside glass plate 21a is detachable to enable welding fumes etc. to be discharged.

The first and second jigs 30, 40 are both cylindrically shaped. Their abutting front end faces are formed with recesses 31, 41 for positioning and holding the diaphragms 2. The recesses 31, 41 are provided at their center bottoms with magnets 32, 42. The magnets 32, 42 may be permanent magnets or electromagnets.

Figure 3B:
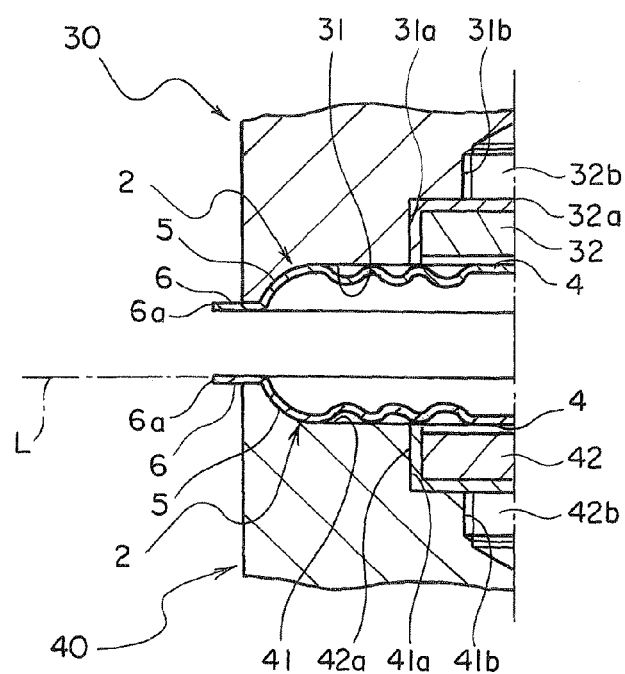
FIG. 3B is an enlarged cross-sectional view of principal parts of FIG. 3A.

The magnets 32, 42, as shown in FIG. 3B, are embedded in the first and second jigs 30, 40. The magnetic force of the magnet 32 of the upper first jig 30 is set stronger than the magnetic force of the magnet 42 of the second jig 40. The outer peripheries of the magnets 32, 42 are covered by yokes 32a, 42a for guiding the magnetic lines of force and are fit into engagement recesses 31a, 41a provided at the bottom centers of the recesses 31, 41. The engagement recesses 31a, 41a are provided at their bottoms with threaded holes 31b, 41b into which threaded shafts 32b, 42b projecting from the yokes 32a, 42a can be screwed for fastening.

The recesses 31, 41 of the first and second jigs 30, 40 are positioned and fit with the flexible parts 4 and positioning parts 5 of the diaphragms 2, 2 which are then held in place by the magnets 32, 42. The outer peripheral edges of the flanges 6 of the diaphragms 2 are made to project out from the outer peripheries of the jigs 30, 40 by having the recesses 31, 41 position and hold the flexible parts 4 and positioning parts 5 of the diaphragms 2, 2.

As shown in FIG. 3A, the upper first jig 30 is fixed to the bottom end of the shaft 51. The shaft 51 is inserted into a bore 24a formed in the ceiling 24 of the pressure vessel 20 rotatably and slidably in the vertical direction. The shaft 51 is driven by a not shown motor of elevator mechanism.

The bottom second jig 40 is mounted to the bottom end of the shaft 61 rotatably inserted into a not shown bore formed in the floor 25 of the pressure vessel 20. This shaft 61 is driven by a not shown motor etc.

The laser system 70 is disposed to face the window 21. It is positioned so that the optical axis of the fired laser beam L strikes the outer peripheral edge 6a of the flange 6 of the diaphragm 2 held by the lower second jig 40 not movable in the vertical direction from a horizontal direction (substantially perpendicular to shaft of diaphragm). As the laser system 70, a YAG laser or other various laser systems may be used.

Next, the operation of the production apparatus 10 will be explained. First, the pressure vessel 20 is opened and the first and second jigs 30, 40 provided in the pressure vessel 20 in the vertical direction are set with diaphragms 2, 2. The diaphragms 2, 2 are magnetically held by the first and second jigs 30, 40.

Next, the pressure vessel 20 is sealed and evacuated. In this state, the diaphragms 2, 2 held by the first jig 30 and the second jig 40 are separated from each other in the vertical direction.

After this, the inside of the pressure vessel 20 is charged and pressurized with a mixed gas including helium gas and argon gas. The ratio of mixture of the helium gas and argon gas in this mixed gas is the same as the ratio of mixture of the mixed gas charged inside the high pressure chamber 3. Further, the pressure of the mixed gas inside this pressure vessel 20 is the same as the initial pressure P0 of the mixed gas charged inside the high pressure chamber 3.

Under this pressurized gas atmosphere, the shaft 51 is made to descend by a not shown elevator mechanism so as to push the first jig 30 toward the second jig 40 and bring the flanges 6, 6 of the diaphragms 2, 2 into close contact.

Next, a not shown drive system is used to rotate the diaphragms 2, 2 held by the first and second jigs 30, 40 and the laser beam L from the laser system 70 is fired against the outer peripheral edges 6b, 6a of the flanges 6, 6 of the closely contacting diaphragms 2, 2 to weld the entire circumference of the flanges 6, 6, form a Weld bead 8, and thereby seal the inside of the high pressure chamber 3.

Next, the gas in the pressure vessel 20 is released to the atmosphere, the pressure vessel 20 is opened, and the sealed welded diaphragm damper 1 is taken out.

The diaphragm damper 1 taken out is then measured for the amount of leakage of helium gas by a not shown helium leakage tester and is judged for passing/defective quality. Rather than the amount of leakage of argon gas, the amount of leakage of helium gas is measured because helium has a smaller molecular weight than argon and leaks more easily.

The criteria for judging passing/defective quality is for example set to an extremely fine amount of leakage of $1 \times 10^{-6}$ Pa m$^3$/sec or less.

Finally, the total width of the produced-diaphragm damper 1 is measured and if in a preset value, the damper is deemed passing.

Note that in the present invention, the mixed gas including helium is not limited to the above mixed gas. Various mixed gases such as helium and argon (He+Ar), carbon dioxide and helium ($CO_2$+He), argon, carbon dioxide, and helium (Ar+$CO_2$+He), etc. may be used. Further, the content of the helium (He), for the reasons explained above, is preferably 20±5 vol %, more preferably 20±3 vol %, still more preferably 20±1 vol %.

In an experiment, the vessel was evacuated to about 2 kPa, a mixed gas of argon (Ar) in an amount of 80% and helium (He) in an amount of 20% was charged, and the pressure was raised to 0.3 MPa. Further, as the equipment of the laser system 70, LD (laser diode) pumping was used. As the mass production condition, continuous output in a range of 220 to 240 W was used. However, the output is adjusted by the welding speed and jig structure to set the conditions for a good melting state. Further, instead of continuous output, pulse output (PW) is also possible. The welding speed used was 1.2 to 1.8 m/min.

Note that the present invention is not limited to the above embodiment and may be modified in various ways within the scope of the present invention.

INDUSTRIAL APPLICABILITY

In the above way, the diaphragm damper obtained by the method of production and production apparatus of the present invention is resistant to leakage of the charged gas over a long period, is superior in reliability, and may be used well in high pressure fuel pumps and other locations where pulsation occurs.

The invention claimed is:

1. A method of producing a diaphragm damper having a high pressure chamber which includes two diaphragms welded together at their flanges and charged inside with a high pressure gas, the method comprising the steps of:
    forming the diaphragms from metal sheets and using a pair of jigs to face each other in a pressure vessel to hold the diaphragms;
    sealing and evacuating the pressure vessel, then charging and pressurizing a mixed gas including helium in the pressure vessel, then bringing the pair of jigs relatively near each other to bring the flanges of the pair of diaphragms into close contact; and
    welding outer peripheral edges of the flanges of the diaphragms along an entire circumference of the diaphragms in the pressure vessel, wherein
    each diaphragm comprises:
    a disk shaped flexible part;
    a positioning part formed in a continuous manner from an outer periphery of the disk shaped flexible part and bent to have an arc-shaped cross-section, wherein the positioning part is configured to form a half space for a high pressure chamber in combination with the disk shaped flexible part; forming the flange to be integral with an outer periphery of the positioning part to define a flat ring shape,
    the mixed gas includes 15 to 25 vol % of helium gas, and when welding the entire circumference of the flanges, inside the pressure vessel, the pressure of the mixed gas is, by gauge pressure, a pressure of 0.1 to 0.5 MPa,
    the jigs are simultaneously rotated in the pressure vessel to rotate the pair of diaphragms, and a laser beam is directed at the outer peripheral edges of the flanges of the diaphragms from a direction substantially perpendicular to a rotation axis of the diaphragms, wherein the flanges are welded along their entire circumferences in the pressure vessel, each jig is formed with a positioning recess for holding the diaphragm so as to be positioned by the positioning part and housing the disk shaped flexible part and the positioning part, the outer peripheral edges of the flanges of the diaphragms project out from outer peripheries of the jigs when the entire circumference of the flanges of the diaphragms are welded by the laser beam.

2. The method according to claim 1, wherein the disk shaped flexible part is formed with repeated patterns of coaxial concentric ring-shaped recesses and ring-shaped ridges, and the diaphragms are formed to have common shapes as each other.

3. The method according to claim 2, wherein a magnet which detachably holds the diaphragm by a magnetic force is arranged at a center of the positioning recess.

4. The method according to claim 1, wherein the mixed gas includes helium gas and argon gas, and the diaphragm damper is judged by measuring the amount of leakage of helium gas after the diaphragm damper is taken out from the pressure vessel.

5. The method according to claim 4, wherein the mixed gas includes 75 to 85 vol % of argon gas.

6. The method according to claim 1, wherein the metal sheets of the diaphragms are magnetically attractable and held by a magnetic force with the pair of jigs provided to face each other in the pressure vessel.

\* \* \* \* \*